US012801407B2

(12) United States Patent

Shachaf et al.

(10) Patent No.: US 12,801,407 B2
(45) Date of Patent: Nov. 17, 2026

(54) ROUTINE MINING USING VARIABLE SLIDING WINDOW

(71) Applicant: NICE LTD., Ra'anana (IL)

(72) Inventors: Yuval Shachaf, Tzur Moshe (IL); Gal Tesler, Cresskill, NJ (US); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 330 days.

(21) Appl. No.: 18/639,671

(22) Filed: Apr. 18, 2024

(65) Prior Publication Data

US 2025/0328361 A1 Oct. 23, 2025

(51) Int. Cl.
*G06F 9/45* (2006.01)
*G06F 9/32* (2018.01)
*G06F 9/451* (2018.01)

(52) U.S. Cl.
CPC .............. *G06F 9/451* (2018.02); *G06F 9/321* (2013.01)

(58) Field of Classification Search
CPC ................................. G06F 9/451; G06F 9/321
See application file for complete search history.

(56) References Cited

U.S. PATENT DOCUMENTS

2021/0042338 A1* 2/2021 Smutko ............... G06F 11/3438
2022/0044168 A1* 2/2022 Oberman ........... G06Q 10/0633
2022/0114516 A1* 4/2022 Smutko .......... G06Q 10/063114
2022/0283922 A1* 9/2022 Shachaf .................. G06N 3/08

* cited by examiner

*Primary Examiner* — Dong U Kim

(57) ABSTRACT

A system is adapted to automatically create new automation routines. The system includes a processor configured to, over a period of time, store L actions taken by one or more customer support agents and, in real time, for values of n between a first loop value and a second loop value: with a window of length n, starting at the first position within the stored actions and ending at the L-nth position within the stored actions, repeatedly: scan the stored L actions; create an automation candidate from the actions that fall within the window; store the automation candidate; increment the position of the window; and increment the value of n. The processor is further configured to identify repeated automation candidates of the stored automation candidates; filter the repeated automation candidates to select final automation candidates; and create new automation routines from the final automation candidates.

20 Claims, 18 Drawing Sheets

| PATTERN | COUNT |
|---|---|
| 410 → 5-8-3-11-2 | 3 |
| 420 → 8-3-11-2-5 | 3 |
| 430 → 5-65-34-21-6 | 1 |

| PATTERN | | SUPPORT |
|---|---|---|
| 510 → | 5-8-3-11-2-5 | 3 |
| 520 → | 5-65-34-21-6-5 | 1 |

170

Post process – remove low support (<2) patterns

| | PATTERN (size 5) | COUNT / SUPPORT |
|---|---|---|
| 410 → | 5-8-3-11-2 | 3 |
| 420 → | 8-3-11-2-5 | 3 |
| 430 → | ~~5-65-34-21-6~~ | ~~1~~ |

| | PATTERN (size 6) | COUNT / SUPPORT |
|---|---|---|
| 510 → | 5-8-3-11-2-5 | 3 |
| 520 → | ~~5-65-34-21-6-5~~ | ~~1~~ |

Figure 7

ROUTINE MINING USING VARIABLE SLIDING WINDOW

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The subject matter described herein relates to devices, systems, and methods for discovering new automation routines. This sliding window routine mining system has particular, but not exclusive, utility for task automation in front office and back office operations.

BACKGROUND

The concept of computer task automation is known, and used across a variety of industries to lessen operator workload for repetitive tasks. A key-step of is identifying business processes within an enterprise that are significant candidates for automation. Good candidates include tasks that are feasible for automation and that have high potential return on investment (ROI). One formidable challenge is to decide which of the discovered routines is important enough to be highlighted as a potential for automation. This may require a balance between not missing important routines while not overwhelming the business analyst with too many findings. It may also be important to keep report runtime to a few hours or less, under reasonable hardware constraints. Efficient discovery of new automation routines remains a challenging task.

Accordingly, long-felt needs exist for improved automation of routine discovery systems and methods that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a sliding window routine mining system. The present disclosure offers a novel method to mine automation routines from a long string of operator actions (e.g., hundreds, thousands, or millions of actions), without segmenting the stream into sentences that attempt to isolate individual repetitive tasks. Patterns are found using sliding windows of different sizes. The present disclose also includes a novel method to deal with conflicts arising from the overlap of action instances within the identified patterns, both within the same size of patterns and also across patterns of different sizes.

The sliding window routine mining system disclosed herein has particular, but not exclusive, utility for automation of repetitive tasks in front office and back office operations such as call centers, contact centers, financial analysis service centers in banks, loan request form filling, insurance policy requests, and technical support ticket opening.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system adapted to automatically create new automation routines. The system includes a processor and a non-transitory computer readable medium operably coupled thereto, the computer readable medium including a plurality of instructions stored in association therewith that are accessible to, and executable by, the processor, to perform operations. The operations include: over a period of time, storing L actions taken by one or more customer support agents; in real time, for values of n between a first loop value and a second loop value: with a window of length n, starting at the first position within the stored actions and ending at the L-nth position within the stored actions, repeatedly: scanning the stored L actions; creating an automation candidate from the actions that fall within the window; storing the automation candidate; and incrementing the position of the window. The operations then include incrementing the value of n. The operations also include identifying repeated automation candidates of the stored automation candidates; filtering the repeated automation candidates to select final automation candidates, creating new automation routines from the final automation candidates, storing the new automation routines in an automations database, and reporting the new automation routines to a user. Other embodiments of this aspect include corresponding computer systems, apparatus, and computer programs recorded on one or more computer storage devices, each configured to perform the actions of the methods.

Implementations may include one or more of the following features. In some embodiments, filtering the repeated automation candidates to select final automation candidates may include rejecting repeated automation candidates that occur less than a threshold number of times. In some embodiments, the threshold number of times is user configurable. In some embodiments, filtering the repeated automation candidates to select final automation candidates may include: identifying a repeated automation candidate of length n that contains a repeated automation candidate of length n-1; if the repeated automation candidate of length n has a same or greater number of occurrences as the repeated automation candidate of length n-1: accepting the repeated automation candidate of length n; and rejecting the repeated automation candidate of length n-1; or if the repeated automation candidate of length n has a smaller number of occurrences than the repeated automation candidate of length n-1: accepting the repeated automation candidate of length n-1; or rejecting the repeated automation candidate of length n. In some embodiments, filtering the repeated automation candidates to select final automation candidates may include: identifying two of the repeated automation candidates of a same length that share an action of the L actions; accepting the repeated automation candidate of the two of the repeated automation candidates that has the largest number of occurrences; and rejecting the repeated automation candidate of the two repeated automation candidates that does not have the largest number of occurrences. In some embodiments, if the two repeated automation candidates have a same number of occurrences, selecting the first candidate of the two repeated automation candidates, selecting the second candidate of the two repeated automation candidates, or selecting a random candidate of the two repeated automation candidates. In some embodiments, filtering the repeated automation candidates to select final automation candidates may include: identifying two of the repeated automation candidates of different lengths that share an action of the L actions; accepting the repeated automation candidate of the two of the repeated automation candidates that has the greatest length; and rejecting the repeated automation candidate of the two repeated automation candidates that does not have the greatest length. In some embodiments, the first loop value is 5 and the second loop value is 30. In some embodiments, the operations further may include converting the new automation routine into code. In some embodiments, the operations further may include making the code available on an automation finder application. Implementations of the described techniques may include hardware, a method or process, or computer software on a computer-accessible medium.

One general aspect includes a computer-implemented method for automatically creating new automation routines. The computer-implemented method includes, with a processor and a non-transitory computer readable medium operably coupled thereto: over a period of time, storing L actions taken by one or more customer support agents; in real time, for values of n between a first loop value and a second loop value: with a window of length n, starting at the first position within the stored actions and ending at the L-nth position within the stored actions, repeatedly: scanning the stored L actions; creating an automation candidate from the actions that fall within the window; storing the automation candidate; and incrementing the position of the window. The method also includes incrementing the value of n. The method also includes identifying repeated automation candidates of the stored automation candidates; filtering the repeated automation candidates to select final automation candidates, creating new automation routines from the final automation candidates, storing the new automation routines in an automations database, and reporting the new automation routines to a user. Other embodiments of this aspect include corresponding computer systems, apparatus, and computer programs recorded on one or more computer storage devices, each configured to perform the actions of the methods.

Implementations may include one or more of the following features. In some embodiments, filtering the repeated automation candidates to select final automation candidates may include rejecting repeated automation candidates that occur less than a threshold number of times. In some embodiments, the threshold number of times is user configurable. In some embodiments, filtering the repeated automation candidates to select final automation candidates may include: identifying a repeated automation candidate of length n that contains a repeated automation candidate of length n-1; if the repeated automation candidate of length n has a same or greater number of occurrences as the repeated automation candidate of length n-1: accepting the repeated automation candidate of length n; and rejecting the repeated automation candidate of length n-1; or if the repeated automation candidate of length n has a smaller number of occurrences than the repeated automation candidate of length n-1: accepting the repeated automation candidate of length n-1; or rejecting the repeated automation candidate of length n. In some embodiments, filtering the repeated automation candidates to select final automation candidates may include: identifying two of the repeated automation candidates of a same length that share an action of the L actions; accepting the repeated automation candidate of the two of the repeated automation candidates that has the largest number of occurrences; and rejecting the repeated automation candidate of the two repeated automation candidates that does not have the largest number of occurrences. In some embodiments, if the two repeated automation candidates have a same number of occurrences, selecting the first candidate of the two repeated automation candidates, selecting the second candidate of the two repeated automation candidates, or selecting a random candidate of the two repeated automation candidates. In some embodiments, filtering the repeated automation candidates to select final automation candidates may include: identifying two of the repeated automation candidates of different lengths that share an action of the L actions; accepting the repeated automation candidate of the two of the repeated automation candidates that has the greatest length; and rejecting the repeated automation candidate of the two repeated automation candidates that does not have the greatest length. In some embodiments, the first loop value is 5 and the second loop value is 30. In some embodiments, the operations further may include converting the new automation routine into code. In some embodiments, the operations further may include making the code available on an automation finder application. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the sliding window routine mining system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 7 is a schematic, diagrammatic representation of an example post-processing or filtering step, in accordance with at least one embodiment of the present disclosure.

DETAILED DESCRIPTION

Figure 1:
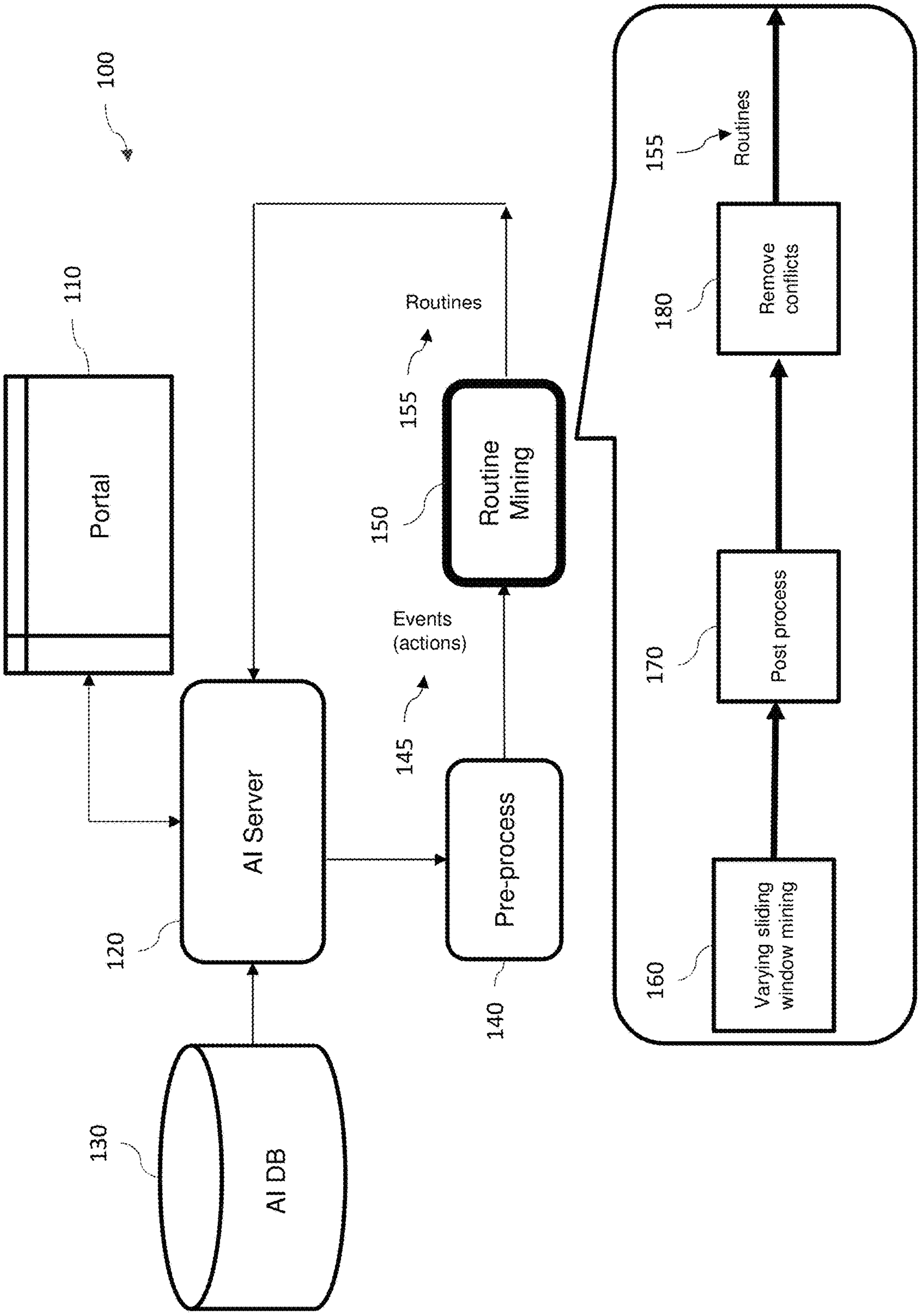
FIG. 1 is a schematic, diagrammatic representation, in block diagram form, of a sliding window routine mining system, in accordance with at least one embodiment of the present disclosure.

In accordance with at least one embodiment of the present disclosure, a sliding window routine mining system is provided which incorporates unsupervised task mining, without the need to perform the traditional segmentation of the data prior the mining.

Mining for patterns or routines out of a long stream of actions or events (e.g., as many as several million actions) is a complex task. Existing approaches segment the long stream of actions into sentences, essentially trying to predict where each business task starts and ends. However, this approach has certain clear drawbacks, as it often cuts a task in the middle, or else cuts it during the task coming immediately after, which can result in task inhomogeneity and poor routine quality. Instead, the present disclosure offers a novel method to skip the segmentation step, and instead directly mine patterns from a stored or ongoing event stream. Patterns are found using sliding windows in different sizes. The present disclose also includes a novel method to deal with conflicts (e.g., overlapping patterns) arising from the overlap of action instances of patterns found, both within the same size of patterns and also across patterns of different sizes.

The present disclosure can assist users by helping them more effectively, quickly, cheaply, and accurately identify automation opportunities, particularly but not exclusively in business needs such as search operations and manual processing of scanned documents.

The present disclosure aids substantially in the discovery of new automation routines, by improving the ability to isolate specific repetitive business tasks from the less-repetitive actions surrounding them. Implemented on a processor in communication with a database of stored user actions, the sliding window routine mining system disclosed herein provides practical improvements in desktop automation. This improved automation routine discovery transforms a slow, labor-intensive, or error-prone process into one that quickly and repeatably isolates and automates key business tasks, without the normally routine need to segment the string of actions prior to mining for new routines. This unconventional approach improves the functioning of the desktop environment, by creating useful automation routines that other routine-mining systems would misidentify or fail to identify.

The sliding window routine mining system may be implemented as a process at least partially viewable on a display, and operated by a control process executing on a processor that accepts user inputs from a keyboard, mouse, or touch-screen interface, and that is in communication with one or more databases that receive user actions from one or more user computers (e.g., desktop, laptop, notebook, or tablet computers). In that regard, the control process performs certain specific operations in response to different inputs or selections made at different times. Certain outputs of the sliding window routine mining system may be printed, shown on a display, or otherwise communicated to human operators, while other may be translated directly into operational code or scripts without the need for human intervention. Certain structures, functions, and operations of the processor, display, sensors, and user input systems are known in the art, while others are recited herein to enable novel features or aspects of the present disclosure with particularity, especially in combination with that which is available in the art.

These descriptions are provided for exemplary purposes only, and should not be considered to limit the scope of the sliding window routine mining system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation, in block diagram form, of a sliding window routine mining system 100, in accordance with at least one embodiment of the present disclosure. An artificial intelligence (AI) server 120 is connected to an application portal 110 in order to initiate insight reports, get the result of the reports, etc. An AI database 130 stores the string or stream of user actions, as well as the results of the routine mining. In order to find new routines, the system's initial phase is a preprocess 140, which formats the data in a manner useful for routine mining. Once the preprocess 140, completes, the routine mining 150 starts by getting as an input the desktop actions or events 145. Outputs of the routine mining 150 are the identified routines 155.

The routine mining module 150 finds repetitive sequential actions of all the users in three parts: The first part is the varying sliding window mining 160, followed by a post process module 170, followed by a remove conflicts module 180. The latter is related to the overlaps of actions instances between the sliding windows mining. The output of the routine mining module 150 are the routines 150, which can then for example be presented in the application portal 110 via a user interface.

The varying sliding window mining module 160 finds sequences of repetitive actions, by counting the number of appearances of each sequence in an incremental size window. This solution does not require segmentation of the incoming event stream into sentences. In an example, segmenting (for example) 2 million actions into sentences, where each sentence represents a business task, is very difficult, because it is difficult for such systems to predict the exact cutting point for each segment or sentence. The present disclosure eliminates this segmentation step, allowing for more accurate and comprehensive routines, with less computational overhead.

In the next step, post process 170, the system filters out patterns with low number of occurrences (e.g., low pattern support), by removing them from the database. In addition, the system removes short patterns that can be replaced by longer patterns that include the shorter ones within them (e.g., rejection of subpatterns). For example, given a pattern (A, B, C, D) and shorter pattern (A, B, C) then the system will remove the shorter pattern ABC. The next step is the remove conflicts block 180, described in detail in FIG. 2, below. Once the conflicts are removed, the remaining routines 155 are final automation candidates, which are passed back to the AI server 120, and may then be stored in the AI database 130, passed back to the portal 110 for review, and/or turned into automation code or scripts. In one embodiment, a user may determine that one or more subpatterns is not essential, not useful, or otherwise not required and may remove or make such subpattern optional or even dependent on certain conditions being present.

Block diagrams are provided herein for exemplary purposes; a person of ordinary skill in the art will recognize myriad variations that nonetheless fall within the scope of the present disclosure. For example, any of the blocks described herein may optionally include an output to a user of information relevant to the block, and may thus represent an improvement in the user interface over existing art by providing information not otherwise available.

Similarly, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Before continuing, it should be noted that the examples described above are provided for purposes of illustration, and are not intended to be limiting. Other devices and/or device configurations may be utilized to carry out the operations described herein.

Figure 2:
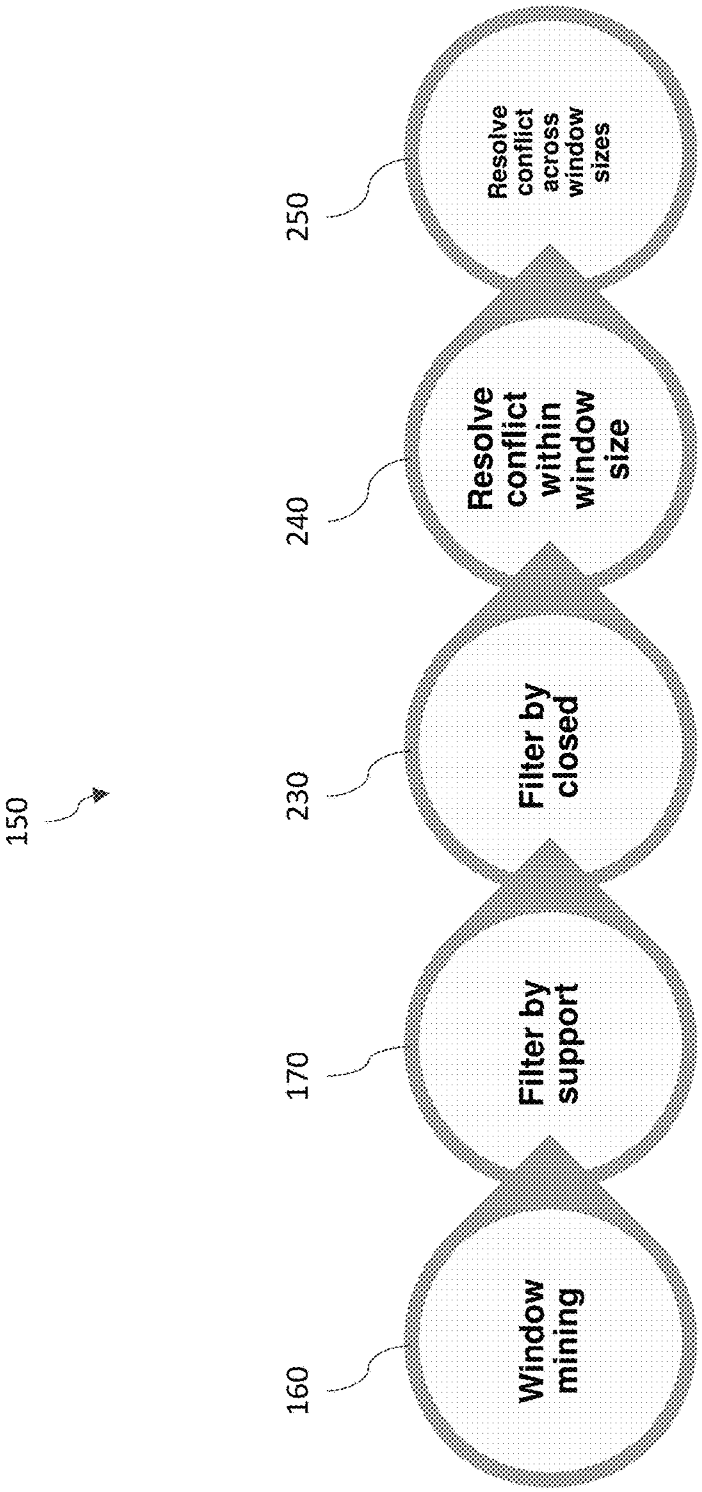
FIG. 2 is a schematic, diagrammatic representation, in block diagram form, of an example routine mining process, in accordance with at least one embodiment of the present disclosure.

FIG. 2 is a schematic, diagrammatic representation, in block diagram form, of an example routine mining process 150, in accordance with at least one embodiment of the present disclosure. The routine mining process mines for new automation routines, and begins with window mining block 160 as described above. The window mining block 160 scans for automation candidate patterns, some of which are repeated patterns or repeated automation candidates that occur multiple times in the event stream.

Next is the postprocessing block or filter-by-support block 170, which filters out patterns or automation candidates that occur less than a threshold number of times. In an example, a pattern or automation candidate that occurs fewer than 5 times, in an event stream of 2 million actions, will be filtered out whereas repeated patterns or repeated automation candidates that occur 5 or more times will be passed to the next step. A different threshold may be selected.

Next is the filter-by-closed step 230, in which closed patterns are removed, and supersets of the closed patterns are retained, as described below in FIG. 9.

The next block is the "resolve conflicts within window size" block 240. Removing conflicts is required in the case of having two instances of two different patterns (e.g., two different repeated automation candidates) of the same length that overlap, e.g., that share one or more common actions in the event stream. In his scenario, the instance with larger support (e.g., more occurrences) will be retained, or, in the case of a tie, the system may select the first instance, the second instance, or a randomly selected instance.

The next block is the "resolve conflicts across window sized" block 250. This block removes conflicts of instances of two patterns of different lengths that overlap, e.g., that have one or more common actions in the event stream. In this case, the system will retain the longer pattern, in order to encourage longer and more comprehensive routines, and will reject the shorter pattern, unless the shorter pattern has more occurrences (e.g., that exceed the threshold requirement), in which case the shorter pattern will be retained and the longer pattern will be rejected, as described below in FIG. 13.

Figure 3:
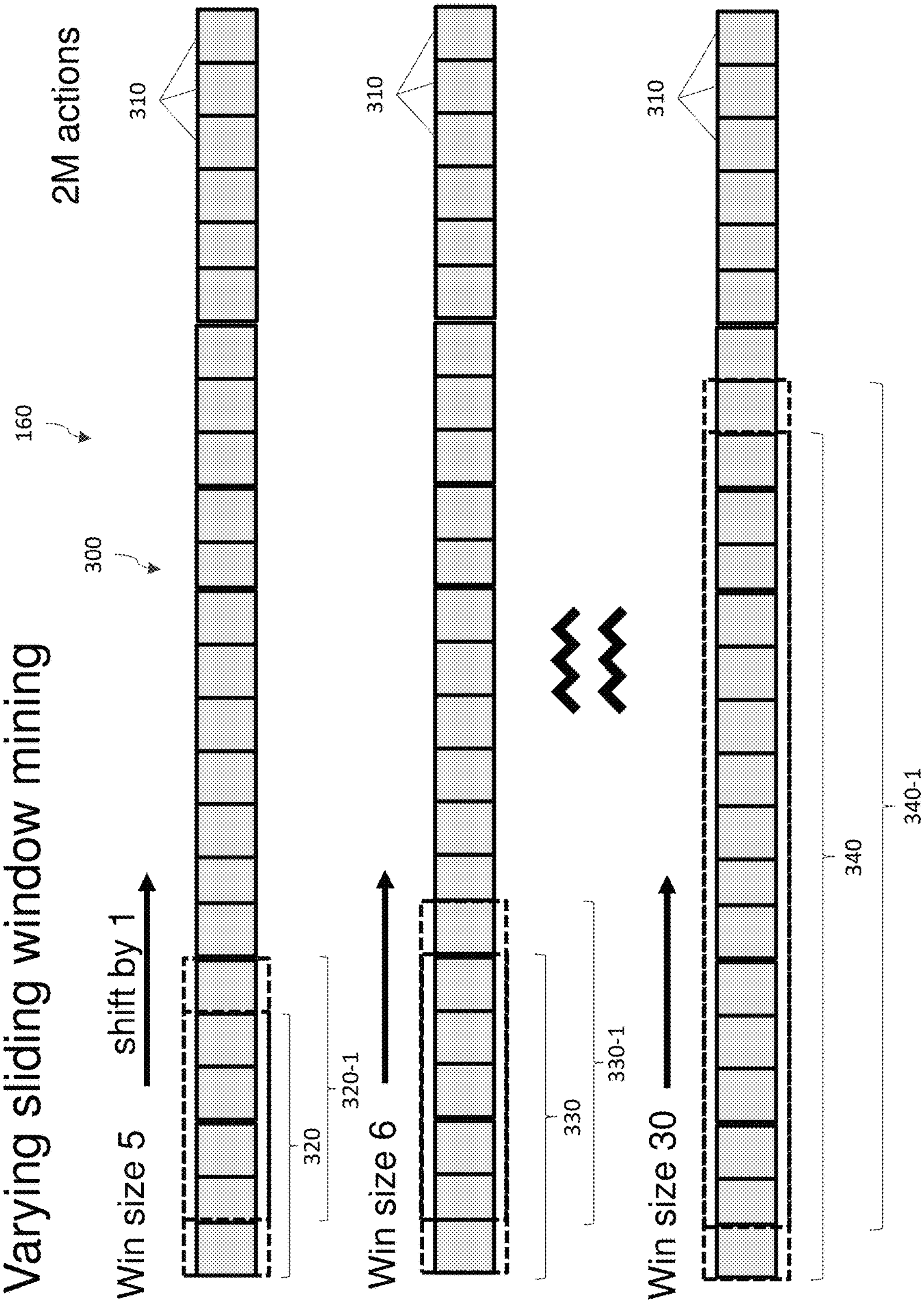
FIG. 3 is a schematic, diagrammatic representation of a sliding window routine mining process, in accordance with at least one embodiment of the present disclosure.

FIG. 3 is a schematic, diagrammatic representation of a sliding window routine mining process 160, in accordance with at least one embodiment of the present disclosure. The sliding window routine mining process 160 begins with a string or stream of stored events or user actions 310, known herein as an event stream 300, of length L (e.g., a string or stream comprising L actions). The event stream 300 may, for example, consist of any large number, such as 2 million, individual events or user actions 310. The event stream 300 is then scanned with a sliding window 320 of a specified minimum size n. In an example, the specified minimum size is 5 events or user actions 310. The contents of the window 310 (e.g., the sequence of n events 310 that fall within the window 310) then become an automation candidate. The window 320 is then advanced one position along the event stream 300, becoming a window 320-1, and the contents of the window 320-1 then become a second automation candidate, different from the first automation candidate. This process then continues until the window 320 has been moved across the entire event stream 300 (e.g., to a position of L-n), which will result in L-n separate automation candidates being stored. In the example discussed above, L-n is equal to 2 million minus 5, or 1,999,995 automation candidates.

Next, the window size n is increased by 1 (e.g., from 5 to 6), and the process is repeated, such that another L-n automation candidates (e.g., of length 6 rather than length 5) are stored (e.g., 2 million minus 6, or 1,999,994 new automation candidates).

This process repeats, with the window size n being incremented by 1, and used to scan the event stream 300, until the window size reaches a specified maximum value. In an example, the specified maximum window size n is 30 events or actions 310.

In the example discussed, where L is 2 million, the minimum value of n is 5, and the maximum value of n is 30, this process will result in 59,999,545 automation candidates being stored, with lengths between 5 and 30 events or actions. Some of these automation candidates may occur multiple times, and may thus be considered repeated automation candidates.

Figure 4:
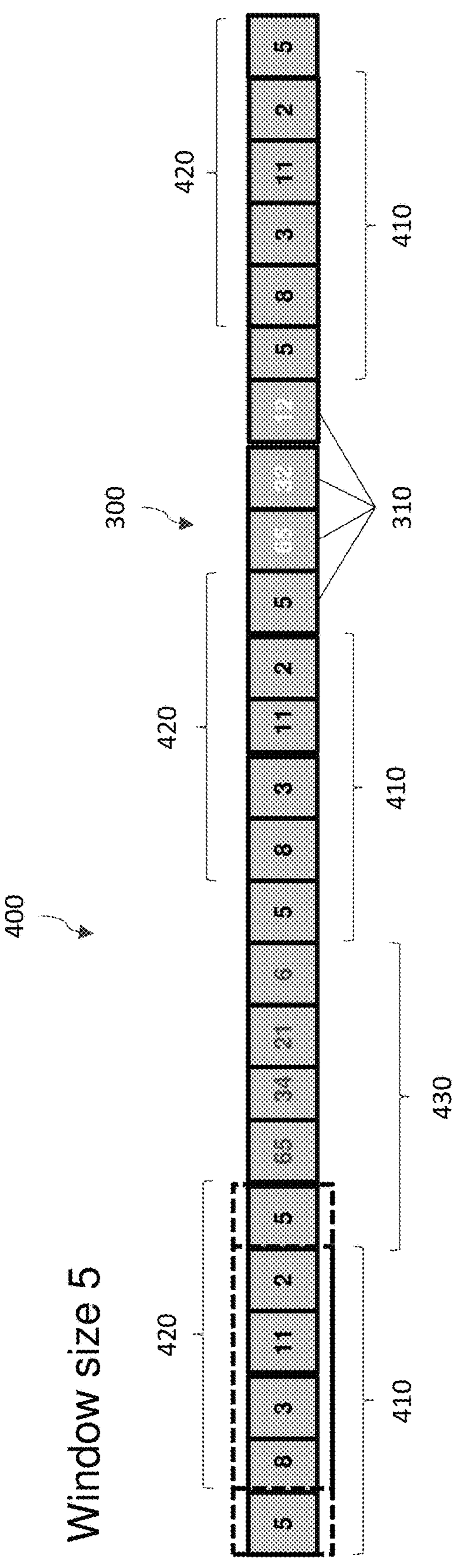
FIG. 4 is a schematic, diagrammatic representation of an example pattern counting process or automation candidate counting process, in accordance with at least one embodiment of the present disclosure.

FIG. 4 is a schematic, diagrammatic representation of an example pattern counting process 400 or automation candidate counting process 400, in accordance with at least one embodiment of the present disclosure. In the example shown in FIG. 4, for explanatory purposes, each action or event 310 is represented by a decimal number. However, in practice, these actions or events 310 may in fact be user actions such as cut, copy, paste, etc., taken within a particular application such as Microsoft Excel, Adobe Acrobat, etc.

Figure 6:
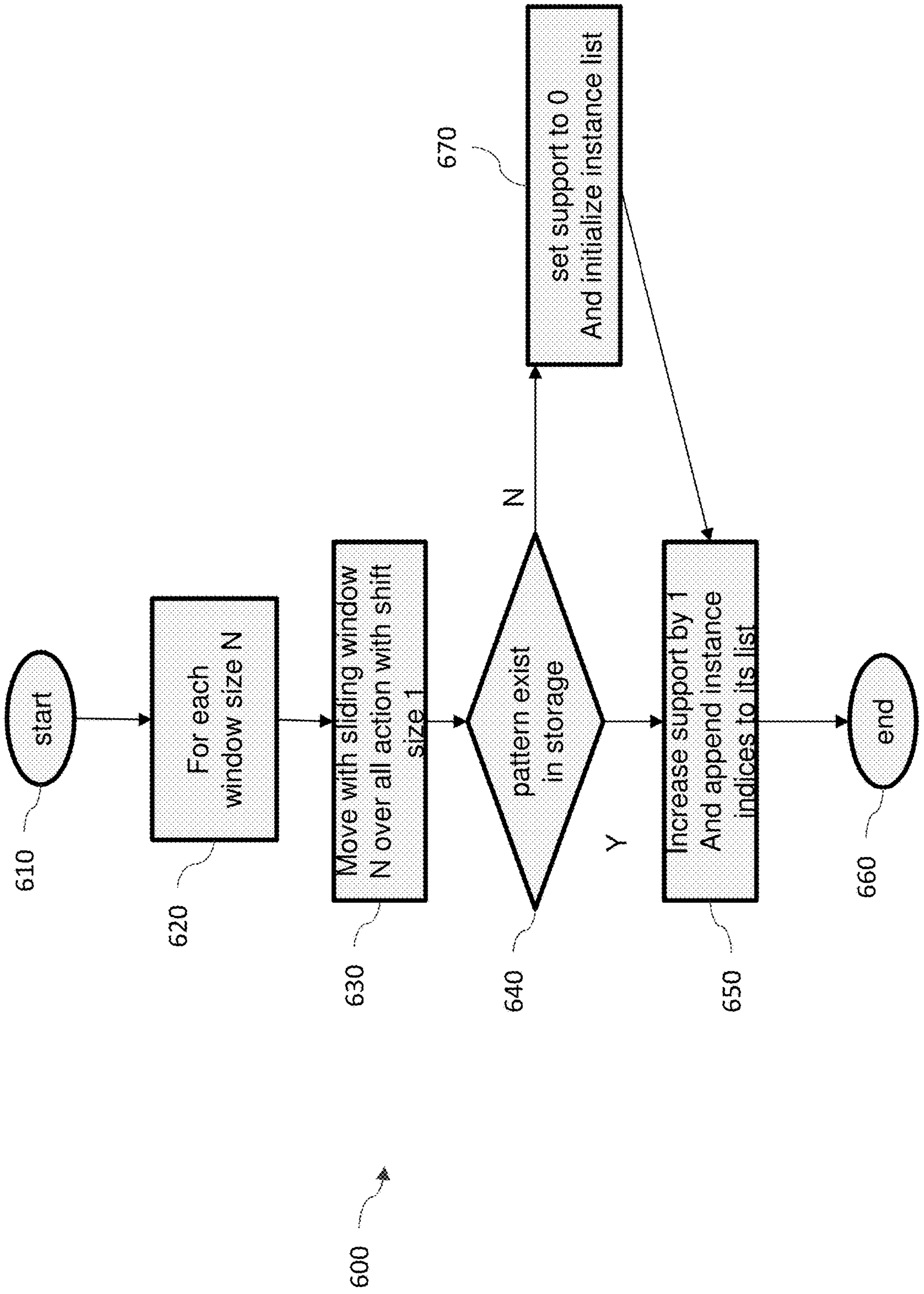
FIG. 6 is a schematic, diagrammatic representation, in flow diagram form, of an example sliding window routine mining method, in accordance with at least one embodiment of the present disclosure.

In the example shown in FIG. 6, a first 5-action pattern or automation candidate 410, consisting of the numbers 5, 8, 3, 11, and 2, occurs 3 times in an example event stream 300 of 25 actions. Similarly, a second 5-action pattern or automation candidate 420, consisting of the numbers 8, 3, 11, 2, and 5, also occurs 3 times. A third 5-action pattern or automation candidate 430, consisting of the numbers 5, 65, 34, 21, and 6, occurs only once.

Figure 5:
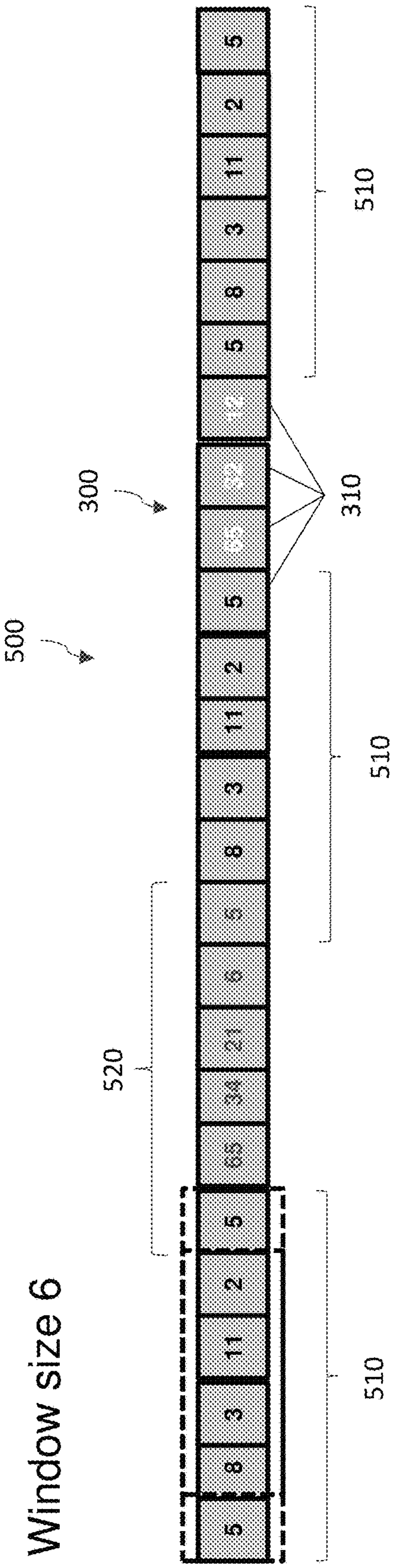
FIG. 5 is a schematic, diagrammatic representation of an example pattern counting process or automation candidate counting process, in accordance with at least one embodiment of the present disclosure.

It should be understood that the 25-event length of the event stream 300 in FIGS. 4 and 5 is used for exemplary and explanatory purposes, and that the length L of the event stream in actual usage may be different, and may be much longer (e.g., several hundred, several thousand, or several million or tens of millions of events or user actions 310).

FIG. 5 is a schematic, diagrammatic representation of an example pattern counting process 500 or automation candidate counting process 500, in accordance with at least one embodiment of the present disclosure. The example of FIG. 5 is similar to that of FIG. 4, in that it shows an exemplary event stream 300 of twenty-five actions 310, each represented by a decimal number rather than an actual user action.

In the example shown in FIG. 5, a first six-event pattern or automation candidate 510, consisting of the numbers 5, 8, 3, 11, 2, and 5, occurs 3 times (e.g., a support of 3), whereas a second six-event pattern or automation candidate 520, consisting of the numbers 6, 65, 34, 21, 6, and 5, occurs only once (e.g., a support of 1).

FIG. 6 is a schematic, diagrammatic representation, in flow diagram form, of an example sliding window routine mining method 600, in accordance with at least one embodiment of the present disclosure. It is understood that the steps of method 600 may be performed in a different order than shown in FIG. 6, additional steps can be provided before, during, and after the steps, and/or some of the steps described can be replaced or eliminated in other embodiments. One or more of steps of the method 600 can be carried by one or more devices and/or systems described herein, such as components of the system 100, AI server 120, and/or processor circuit 1850.

In step 610, the method 600 begins. Execution then proceeds to step 620.

In step 620, the method 600 includes beginning a loop, between a first loop value equal to the minimum window size N and a second loop value equal to the maximum window size N. Execution then proceeds to step 630.

In step 630, the method 600 includes moving a sliding window of size N across the entire event stream by successively shifting it by one position to the right. Execution then proceeds to step 640.

In step 640, the method 600 includes determining whether the pattern currently in the window exists within storage. If yes, execution proceeds to step 650. If no, execution proceeds to step 670.

In step 650, the method 600 includes increasing the support (e.g., the number of occurrence) of the current pattern or automation candidate, and appending the loop indices to an instance list for that pattern or automation candidate. Execution then proceeds to step 660.

In step 660, the method 600 is complete.

In step 670, the method 600 includes setting support for the current pattern to zero and then initializing its instance list. Execution then proceeds to step 650.

Flow diagrams are provided herein for exemplary purposes; a person of ordinary skill in the art will recognize myriad variations that nonetheless fall within the scope of the present disclosure. For example, any of the steps described herein may optionally include an output to a user of information relevant to the step, and may thus represent an improvement in the user interface over existing art by providing information not otherwise available.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to avoid an appearance of lag or latency, it may be desirable to process tens of millions of automation candidates within a period of 10 seconds or less, e.g., by parallelizing for each window size.

FIG. 7 is a schematic, diagrammatic representation of an example post-processing or filtering step 170, in accordance with at least one embodiment of the present disclosure. In the example shown in FIG. 7, a 5-event pattern 410 and a 5-event pattern 420 each occur 3 times (e.g., a count or support of 3), which is equal to or greater than a support threshold (e.g., a threshold of 3) for retention of the pattern or automation candidate. However, a 5-event pattern 430 occurs only once (e.g., a count or support of 1), which is less than the support threshold. Therefore, the pattern or automation candidate 430 is filtered out or rejected. Similarly, a 6-event pattern 510 occurs three times, which is more than the support threshold, so the pattern 510 is retained, whereas a 6-event pattern 520 occurs only once, which is less than the support threshold, so the pattern 520 is filtered out or rejected.

Figure 8:
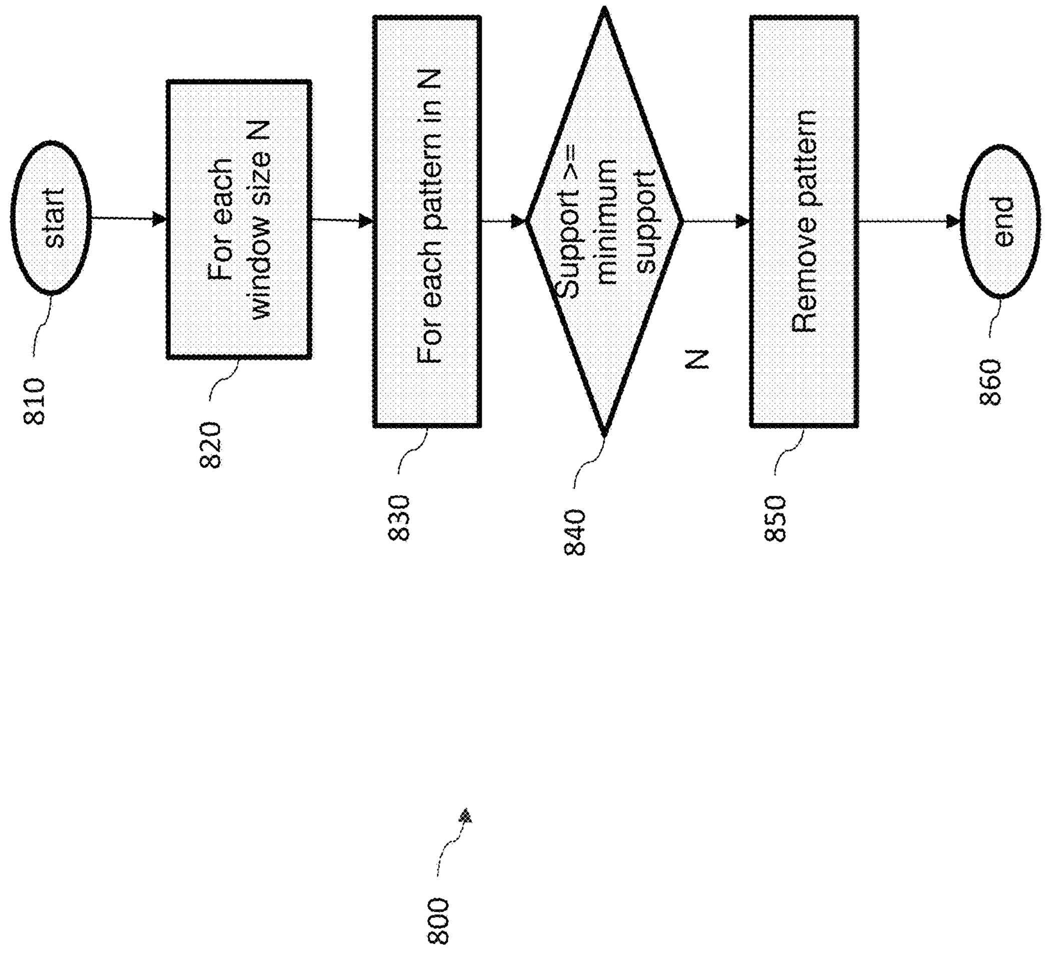
FIG. 8 is a schematic, diagrammatic representation, in flow diagram form, of an example filtering or post-processing method, in accordance with at least one embodiment of the present disclosure.

FIG. 8 is a schematic, diagrammatic representation, in flow diagram form, of an example filtering or post-processing method 800, in accordance with at least one embodiment of the present disclosure.

In step 810, then method 800 begins. Execution then proceeds to step 820.

In step 820, then method 800 includes starting a loop, between a first loop value equal to the minimum window size N and a second loop value equal to the maximum window size N. Execution then proceeds to step 830.

In step 830, then method 800 includes starting a loop of every stored pattern or automation candidate of current window size N. Execution then proceeds to step 840.

In step 840, then method 800 includes determining whether support for the current pattern or automation candidate is greater than a threshold value (e.g., 3 occurrences, 5 occurrences, etc.). If yes, continue the loops. If no, execution then proceeds to step 850.

In step 850, then method 800 includes removing or rejecting the current pattern or automation candidate, and then continuing the loops. When the loops are complete, execution then proceeds to step 860.

In step 860, then method 800 is complete.

Figure 9:
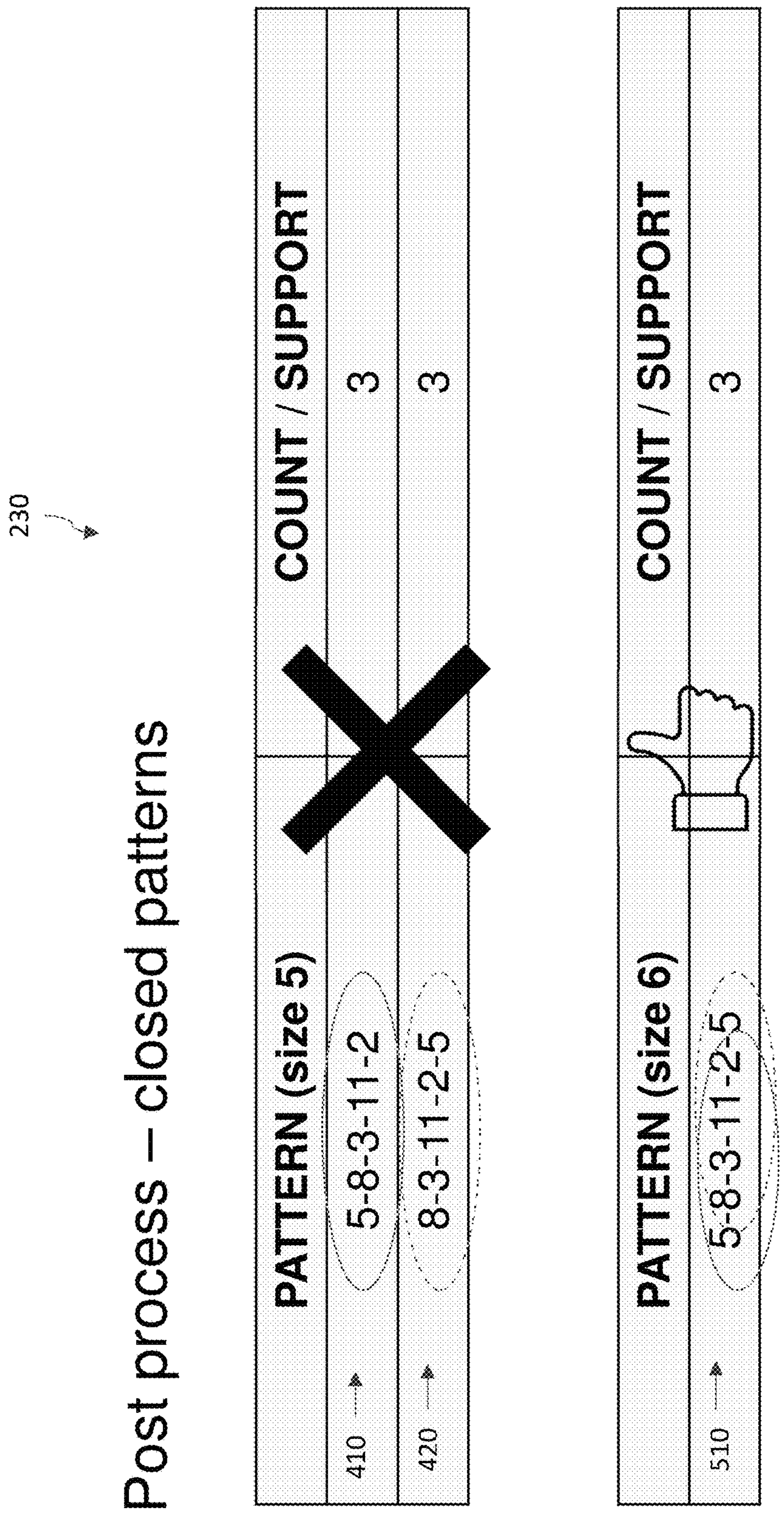
FIG. 9 is a schematic, diagrammatic representation of an example closed pattern filtering process, in accordance with at least one embodiment of the present disclosure

FIG. 9 is a schematic, diagrammatic representation of an example closed pattern filtering process 230, in accordance with at least one embodiment of the present disclosure. In the example shown in FIG. 9, two 5-event automation candidates 410 and 420 each have a support of 3. However, each 5-event automation candidate is a subset of a 6-event automation candidate 510, or, in other words, the 6-event automation candidate 510 is a superset of both automation candidates 410 and 420. In this situation, it is desirable to choose the longer pattern 510 and to reject its two subsets 410 and 420.

More generally, in this embodiment it is desirable to remove a pattern (sub-pattern) that is included within a longer pattern (super-pattern). A "closed pattern" may be defined as a pattern that meets the minimum support criteria, and that has a superset that has the same or greater support.

In the example shown in FIG. 9, a pattern of size 6 includes both size 5 patterns, which therefore comply with closed-pattern criteria. Consequently, the two 5-event automation candidates will be removed or rejected.

The closed-pattern filtering is described in the flow chart below. For each pattern of size N look for all pattern of size N-1. If the size N pattern includes the size N-1 pattern and the support of size N pattern is larger or equal to the size N-1 pattern, remove the size N-1 pattern. If the size N pattern includes the size N-1 pattern but the support of size N pattern is smaller than size N-1 pattern, remove the size N pattern.

Figure 10:
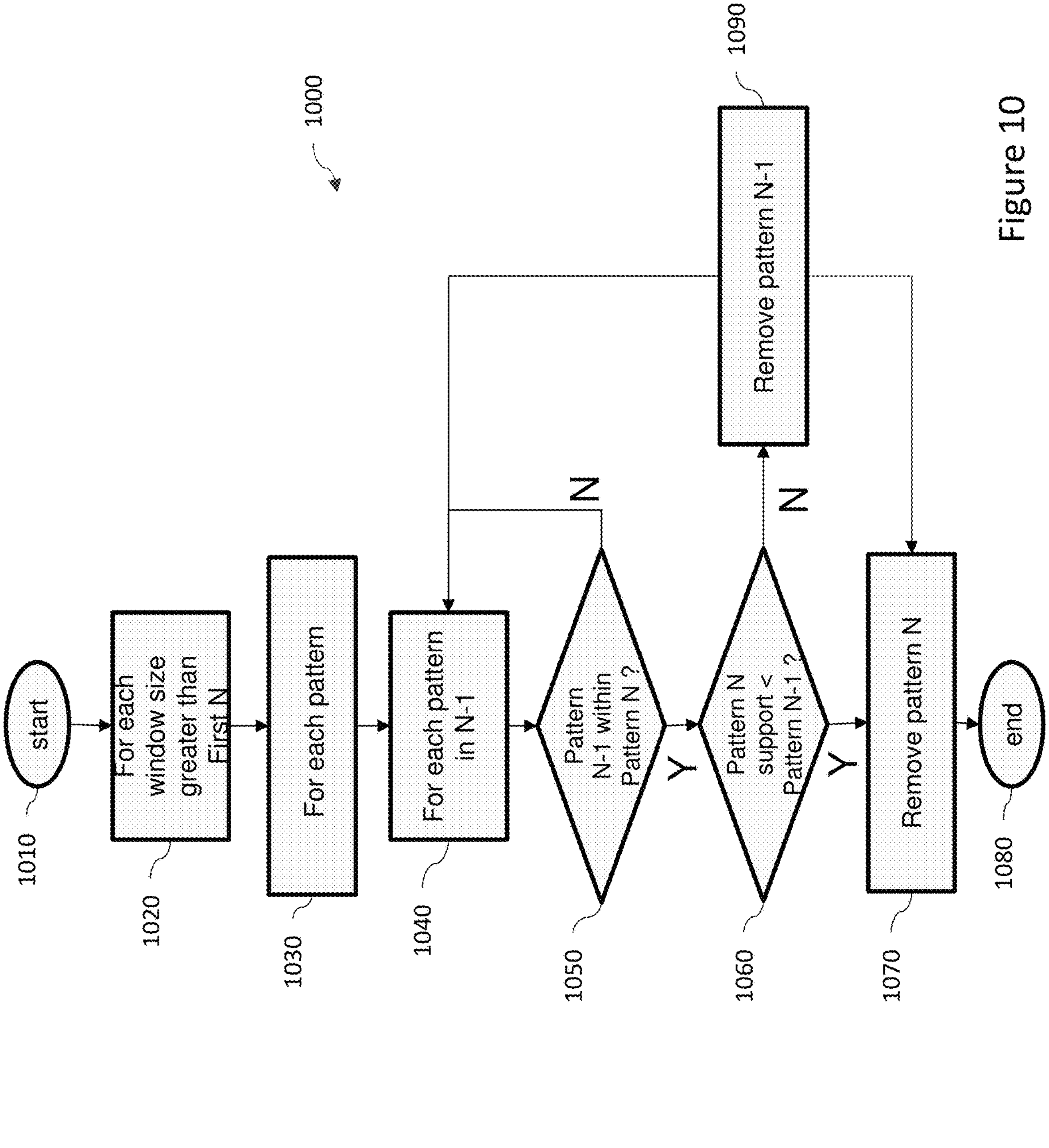
FIG. 10 is a schematic, diagrammatic representation, in block diagram form, of an example closed pattern filtering method, in accordance with at least one embodiment of the present disclosure.

FIG. 10 is a schematic, diagrammatic representation, in block diagram form, of an example closed pattern filtering method 1000, in accordance with at least one embodiment of the present disclosure.

In step 1010 the method 1000 begins. Execution then proceeds to step 1020.

In step 1020, the method 1000 includes beginning a loop, between a first loop value equal to the smallest window size N and a second loop value equal to the largest window size N. Execution then proceeds to step 1030.

In step 1030, the method 1000 includes starting a loop for each pattern of length N. Execution then proceeds to step 1040.

In step 1040, the method 1000 includes starting a loop for each pattern of length N-1. Execution then proceeds to step 1050.

In step 1050, the method 1000 includes determining whether the current pattern of length N-1 can be found within the current pattern of length N. If no, continue the loops. If yes, execution proceeds to step 1060.

In step 1060, the method 1000 includes determining whether the support for the current pattern of length N is less than or equal to the support for the current pattern of length N. If yes, execution proceeds to step 1070. If no, execution proceeds to step 1090.

In step 1070, the method 1000 includes removing or rejecting the current pattern of length N, and continuing the loops. When the loops are complete, execution proceeds to step 1080.

In step 1080, the method 1000 is complete.

In step 1090, the method includes removing or rejecting the current pattern of length N-1, and continuing the loops. When the loops are complete, execution proceeds to step 1080.

Figure 11:
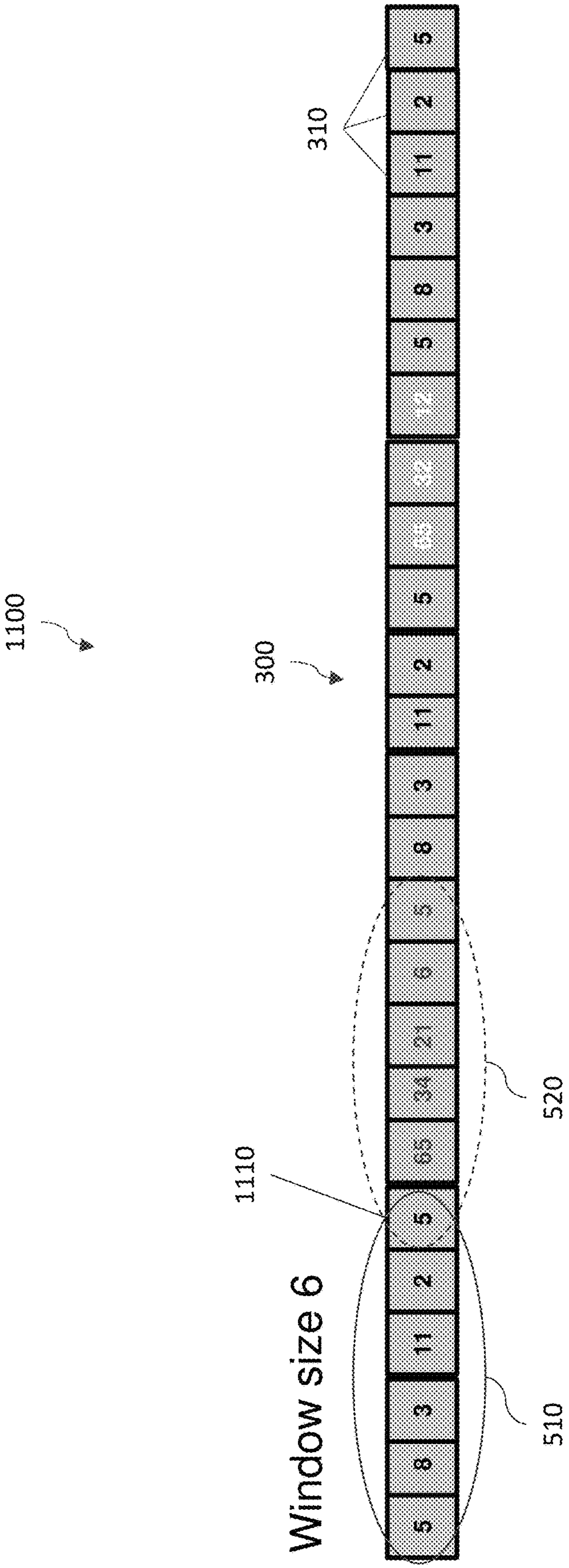
FIG. 11 is a schematic, diagrammatic representation of a conflict between two automation candidates and, which are of the same length, and share a common action, in accordance with at least one embodiment of the present disclosure.

FIG. 11 is a schematic, diagrammatic representation of a conflict 1100 between two automation candidates 510 and 520, which are of the same length, and share a common action 1110, in accordance with at least one embodiment of the present disclosure. Instant conflicts occur when two instances, each of two different patterns, share one or more actions 310 in the event stream 300. In this case, the system needs to decide to which pattern to assign the instance. In such cases, it is desirable to assign the instance to the pattern having larger support. In case of a tie, the system removes the second pattern (although this could be reversed, or could be selected randomly between the conflicting patterns).

The following flow chart describes the algorithm to remove conflicts of two patterns of the same window size. For each pattern on size N, for each of its patterns loop over (inner loop) all its patterns and do pair-wise comparison. In the case where the two compared patterns are exactly the same, move to the next inner loop pattern inline. If not, check if the two patterns overlap. In the case where they do, remove the inner loop pattern if its support is smaller, otherwise remove the outer loop pattern.

Figure 12:
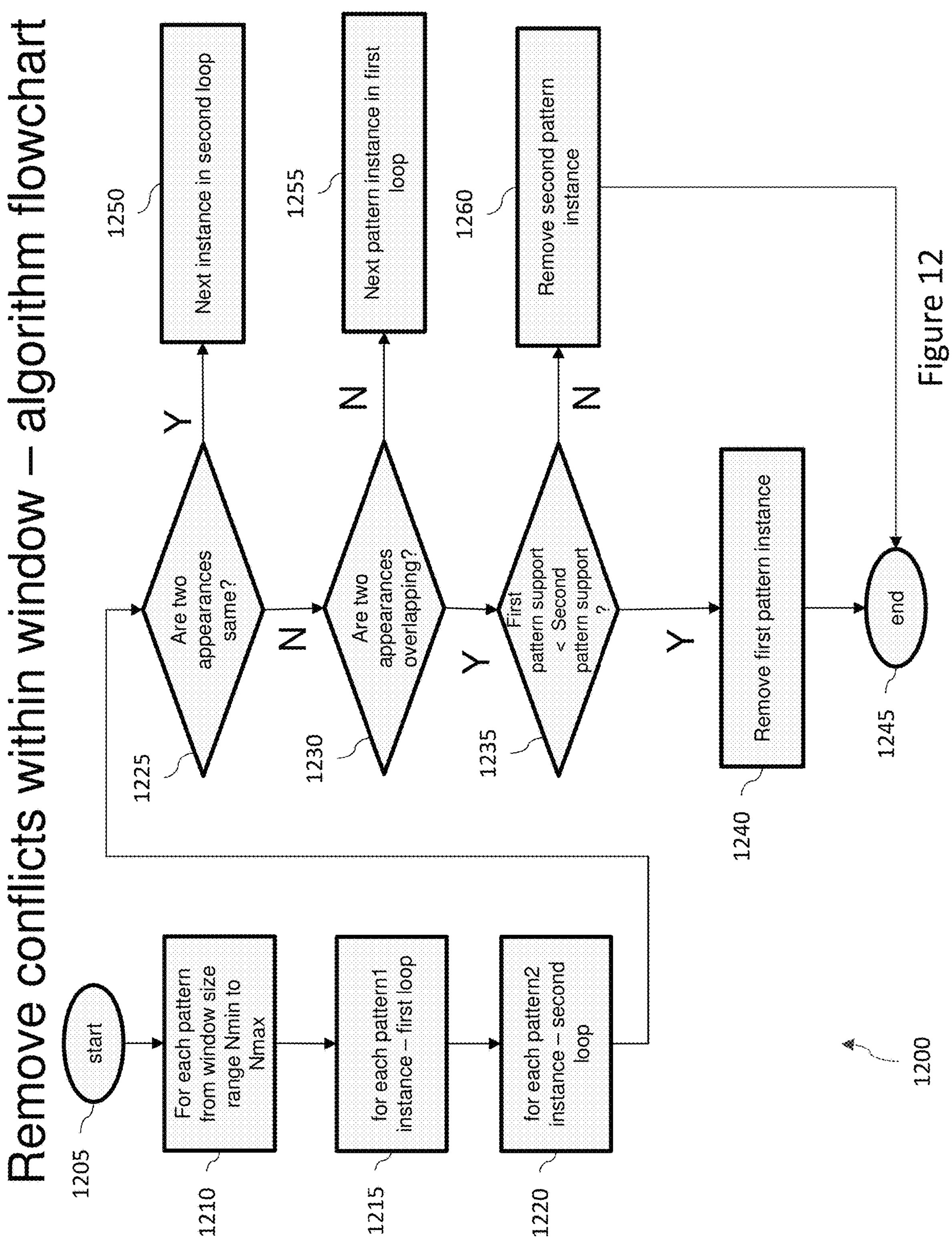
FIG. 12 is a schematic, diagrammatic representation, in flow diagram form, of an example same-window-size conflicts removal method, in accordance with at least one embodiment of the present disclosure.

FIG. 12 is a schematic, diagrammatic representation, in flow diagram form, of an example same-window-size conflicts removal method 1200, in accordance with at least one embodiment of the present disclosure.

In step 1205, the method 1200 begins. Execution then proceeds to step 1210.

In step 1210, the method 1200 includes beginning an outer loop, for each first pattern from the smallest window size to the largest window size. Execution then proceeds to step 1215.

In step 1215, the method 1200 includes starting a first inner loop for each instance of the first pattern. Execution then proceeds to step 1220.

In step 1220, the method 1200 includes starting a second inner loop for each instance of a second pattern. Execution then proceeds to step 1225.

In step 1225, the method 1200 includes determining whether the current instance of the first pattern and the current instance of the second pattern are the same. If yes, execution proceeds to step 1250. If no, execution proceeds to step 1230.

In step 1230, the method 1200 includes determining whether the current instance of the first pattern overlaps with the current instance of the second pattern. If no, execution proceeds to step 1255. If yes, execution proceeds to step 1235.

In step 1235, the method 1200 includes determining whether the first pattern has less support than the second pattern. If no, execution proceeds to step 1260. If yes, execution proceeds to step 1240.

In step 1240, the method 1200 includes removing or rejecting the current instance of the first pattern, and continuing the loops. When the loops are complete, execution proceeds to step 1245.

In step 1245, the method 1200 is complete.

In step 1250, the method 1200 includes continuing the second inner loop.

In step 1255, the method 1200 includes continuing the first inner loop.

In step 1255, the method 1200 includes removing the current instance of the second pattern, and continuing the loops. When the loops are complete, execution proceeds to step 1245.

Figure 13:
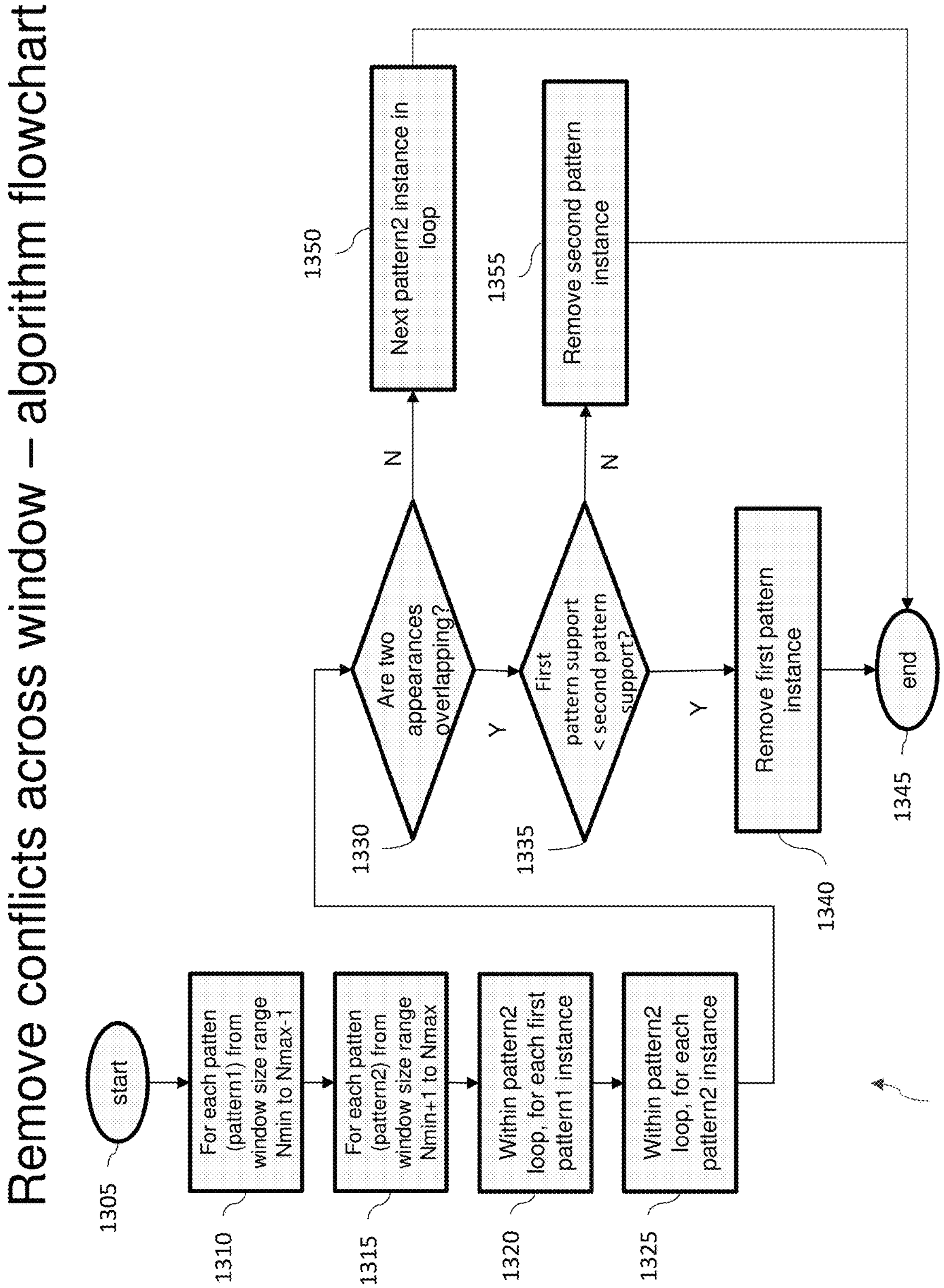
FIG. 13 is a schematic, diagrammatic representation, in flow diagram form, of an example different-window-size conflicts removal method, in accordance with at least one embodiment of the present disclosure.

FIG. 13 is a schematic, diagrammatic representation, in flow diagram form, of an example different-window-size conflicts removal method 1300, in accordance with at least one embodiment of the present disclosure.

In step 1305, the method 1300 begins. Execution then proceeds to step 1310.

In step 1310, the method 1300 includes starting a loop for each for each first pattern from the smallest window size to the largest window size minus one. Execution then proceeds to step 1315.

In step 1315, the method 1300 includes starting a loop for each second pattern from the smallest window size plus one to the largest window size. Execution the proceeds to step 1320.

In step 1320, the method 1320 includes starting a loop for each instance of the first pattern. Execution then proceeds to step 1325.

In step 1325, the method 1300 includes starting a loop for each instance of the second pattern. Execution then proceeds to step 1330.

In step 1330, the method 1300 includes determining whether the current instance of the first pattern and the current instance of the second pattern overlap. If no, execution proceeds to step 1350. If yes, execution proceeds to step 1335.

In step 1335, the method 1300 includes determining whether the first pattern has less support than the second pattern. If no, execution proceeds to step 1355. If yes, execution proceeds to step 1340.

In step 1340, the method 1300 includes removing the current instance of the first pattern, and continuing the loops. When the loops are complete, execution proceeds to step 1345.

In step 1345, the method 1300 is complete.

In step 1350, the method 1350 includes continuing the loops. When the loops are complete, execution proceeds to step 1345.

In step 1355, the method 1300 includes removing the current instance of the second pattern, and continuing the loops. When the loops are complete, execution proceeds to step 1345.

The sliding window routine mining system of the present disclosure can be used to produce potential automations without the need to segment the raw event stream. Automations are composed of actions, translated from the automation finder tool, e.g., as a set of corresponding objects inside an automation studio tool (objects such as workflow steps functions and screen elements). These representations may then be transformed into code, e.g., a set of instructions and logic that a robot then executes at runtime as a dynamic linked library interacting with various applications within an enterprise.

Figure 14:
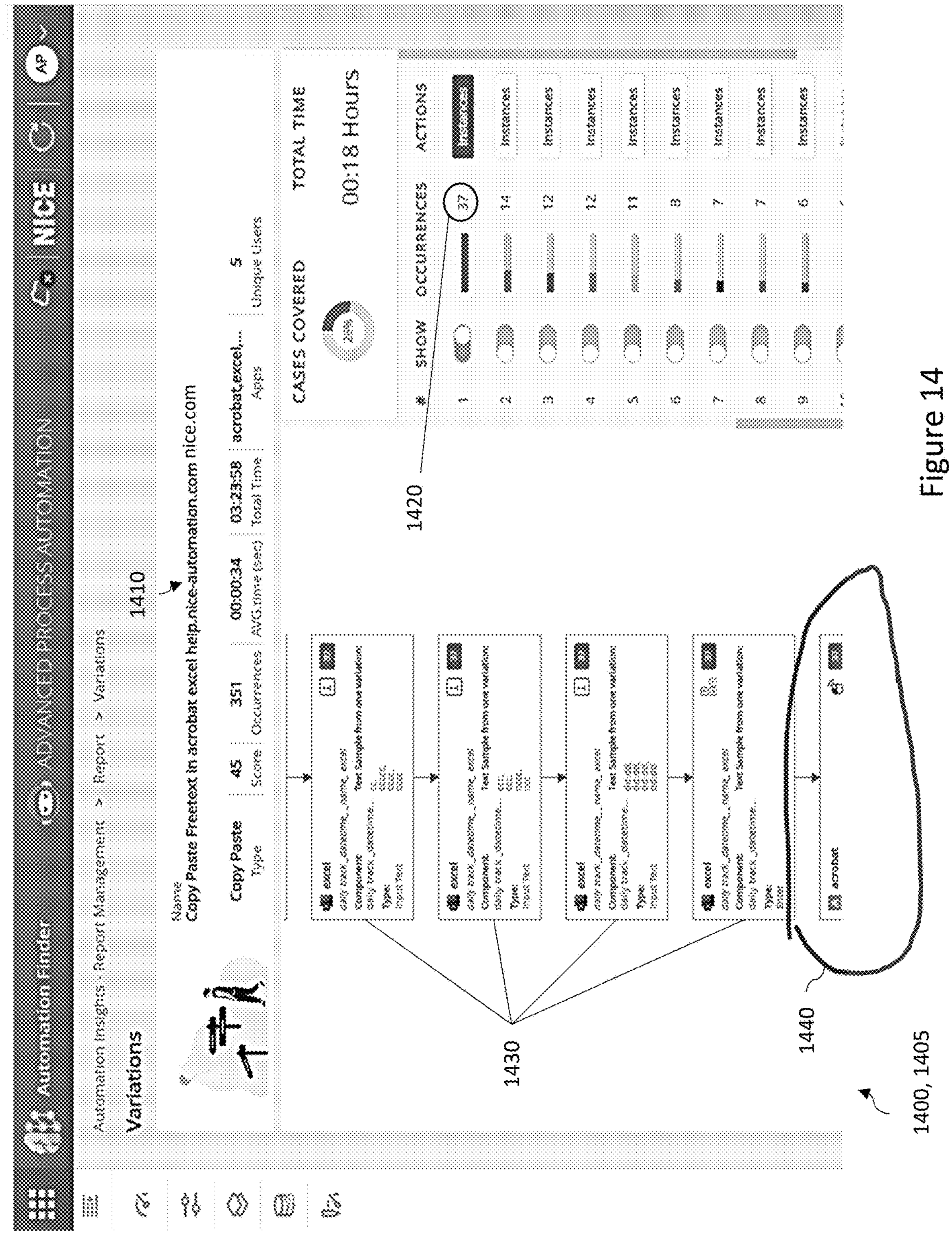
FIG. 14 is an example screen display of an automation routine mined from an event stream without the benefit of the sliding window routine mining system of the present disclosure.

FIG. 14 is an example screen display 1400 of an automation routine 1405 mined from an event stream without the benefit of the sliding window routine mining system of the present disclosure. The screen display 1400 includes a list 1410 of the actions and applications included in the automation routine, including at least four actions 1430 in the Microsoft Excel application and one action 1440 in the Adobe Acrobat application, as well as actions (not shown) in the help.mice-automation.com website and nice.com website. The number of occurrences 1420 is also shown. In the example shown in FIG. 14, the Acrobat application is not actually part of a coherent set of actions to perform a business task, but is merely associated with these actions some of the time. Thus, the inclusion of Acrobat in the automation routine is spurious, and results in a relatively low number of occurrences (e.g., 37 occurrences) for the routine 1405.

Figure 15:
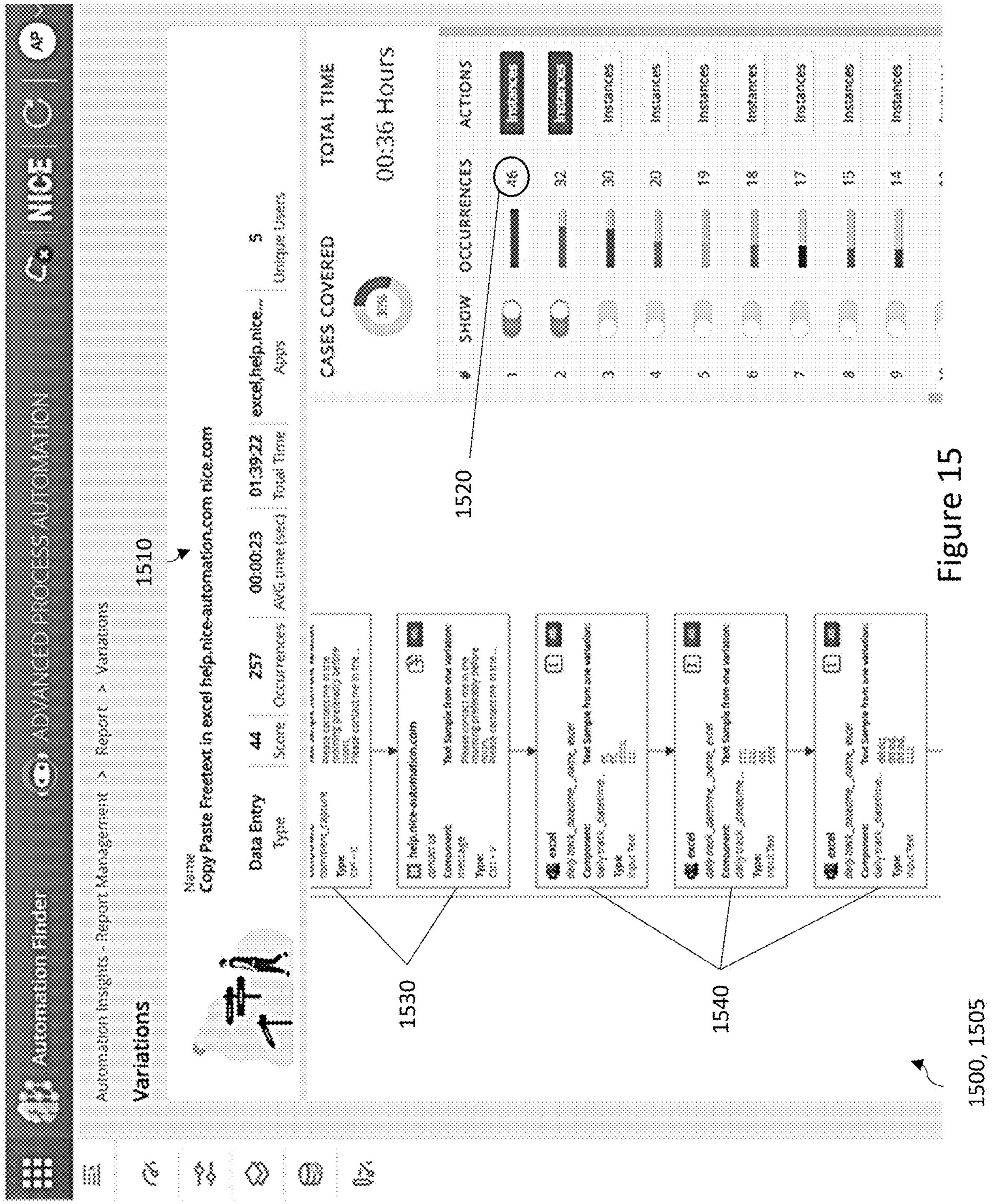
FIG. 15 is an example screen display of an automation routine mined from the event stream of FIG. 14 with the sliding window routine mining system of the present disclosure.

FIG. 15 is an example screen display 1500 of an automation routine 1505 mined from the event stream of FIG. 14 with the sliding window routine mining system of the present disclosure. The screen display 1500 includes a list 1510 of the actions and applications included in the automation routine, including at least two actions 1530 in the help.nice-automation.com website and at least three actions 1540 in the Microsoft Excel application. In the example shown in FIG. 15, because the mined routine 1505 does not include the spurious Adobe Acrobat action, the number of occurrences 1520 is higher (e.g., 46 occurrences). Thus, it can be seen that the sliding window routine mining system of the present disclosure creates higher quality, more focused, more useful automation routines than previously existing routine mining methods.

Figure 16:
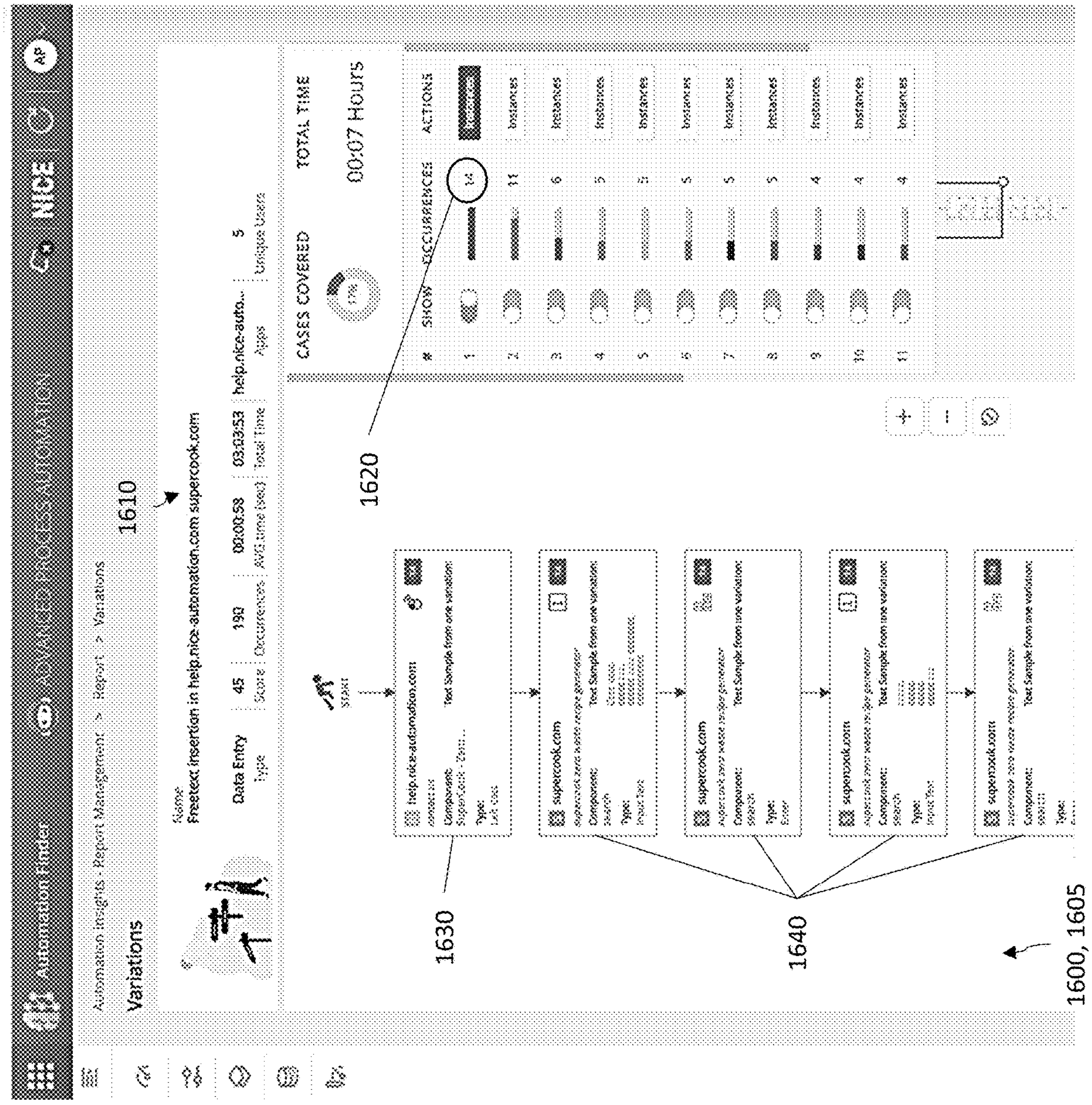
FIG. 16 is an example screen display of an automation routine mined from an event stream, without the benefit of the sliding window routine mining system of the present disclosure.

FIG. 16 is an example screen display 1600 of an automation routine 1605 mined from an event stream, without the benefit of the sliding window routine mining system of the present disclosure. The screen display 1600 includes a list 1610 of the actions and applications in the mined routine 1605, including one action 1630 in the help.nice-automation.com website and at least four actions 1640 in the Microsoft Excel application. The number of occurrences 1620 of this routine in the event stream is 14.

Figure 17:
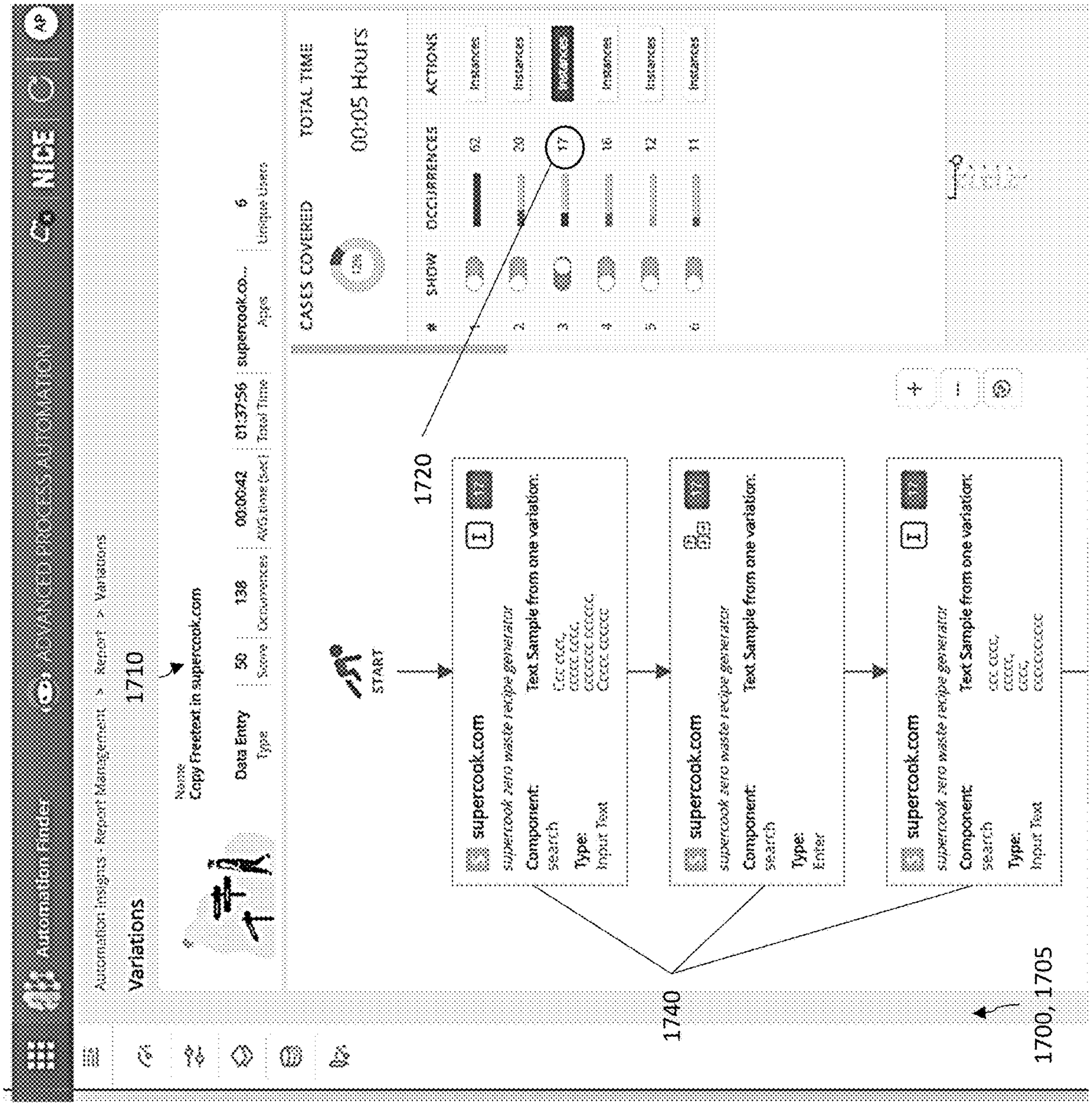
FIG. 17 is an example screen display of an automation routine mined from the event stream of FIG. 16 with the sliding window routine mining system of the present disclosure.

FIG. 17 is an example screen display 1700 of an automation routine 1705 mined from the event stream of FIG. 16 with the sliding window routine mining system of the present disclosure. The screen display 1700 includes a list 1710 of the actions and applications used in the mined routine 1705. In the example shown in FIG. 17, the action taken in the help.nice-automation.com website is not included in the mined routine 1705, which now occurs entirely within the supercook.com website. As a result, the number of occurrences 1720 has increased from 14 in FIGS. 16 to 17 in FIG. 17. Thus, it can be seen that the sliding window routine mining system of the present disclosure creates higher quality, more focused, more useful automation routines than previously existing routine mining methods.

Figure 18:
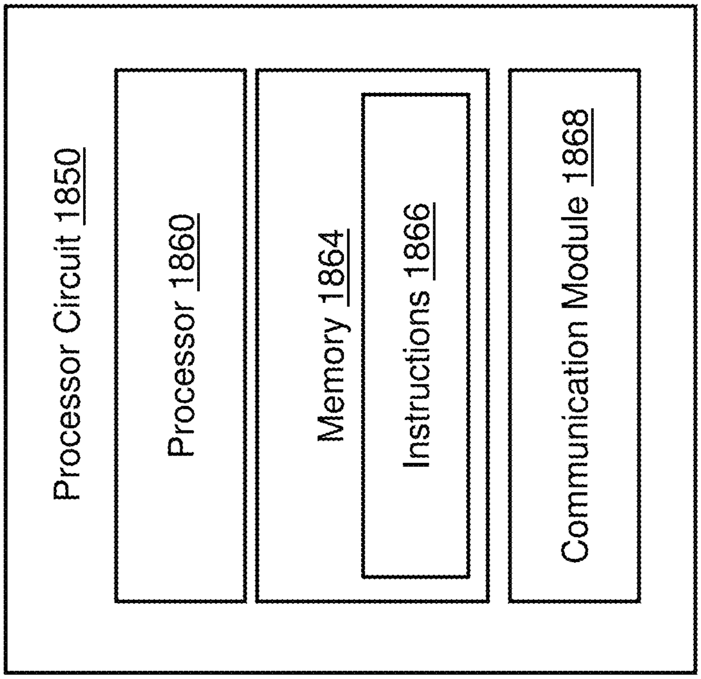
FIG. 18 is a schematic diagram of a processor circuit, according to embodiments of the present disclosure.

FIG. 18 is a schematic diagram of a processor circuit 1850, according to embodiments of the present disclosure. The processor circuit 1850 may be implemented in the system 100, the AI server 120, or other devices or workstations (e.g., third-party workstations, network routers, etc.), or on a cloud processor or other remote processing unit, as necessary to implement the method. As shown, the processor circuit 1850 may include a processor 1860, a memory 1864, and a communication module 1868. These elements may be in direct or indirect communication with each other, for example via one or more buses.

The processor 1860 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1860 may also comprise another hardware device, a firmware device, or any combination thereof configured to perform the operations described herein. The processor 1860 may also be implemented as a combination of computing devices, e.g., a combination of a DSP and a microprocessor, a plurality of microprocessors, one or more microprocessors in conjunction with a DSP core, or any other such configuration.

The memory 1864 may include a cache memory (e.g., a cache memory of the processor 1860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1864 includes a non-transitory computer-readable medium. The memory 1864 may store instructions 1866. The instructions 1866 may include instructions that, when executed by the processor 1860, cause the processor 1860 to perform the operations described herein. Instructions 1866 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1868 can include any electronic circuitry and/or logic circuitry to facilitate direct or indirect communication of data between the processor circuit 1850, and other processors or devices. In that regard, the communication module 1868 can be an input/output (I/O) device. In some instances, the communication module 1868 facilitates direct or indirect communication between various elements of the processor circuit 1850 and/or the system 100. The communication module 1868 may communicate within the processor circuit 1850 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and a central server, etc.) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the sliding window routine mining system repeatably identifies more robust, more useful automation routines than previously existing methods, with a bias toward longer (e.g., more labor saving) routines and also toward the elimination of leading and trailing steps in the automation routines that occur infrequently or are not always associated with the other steps. Accordingly, it can be seen that the sliding window routine mining system fills a long-standing need in the art, by improving the speed and repeatability with which new automation routines can be identified, while also improving the quality of the identified routines.

A number of variations are possible on the examples and embodiments described above. For example, the minimum and maximum window sizes could be different than shown herein, and the length of the mined event stream could be anywhere from a few dozen actions to tens of millions of actions. Post-processing, filtering, and conflict resolution steps could occur in a different order than shown herein, and could employ different logic that achieves the same or similar results. The technology described herein may be employed anywhere that automation would reduce the time and cost of tasks in server, desktop, laptop, notebook, tablet, of handheld computers across a wide variety of industries.

Accordingly, the logical operations making up the embodiments of the technology described herein are referred to variously as operations, steps, blocks, objects, elements, components, or modules. Furthermore, it should be understood that these may occur, or be performed or arranged, in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the sliding window routine mining system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the sliding window routine mining system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically create new automation routines, the system comprising:
- a processor and a non-transitory computer readable medium operably coupled thereto, the computer readable medium comprising a plurality of instructions stored in association therewith that are accessible to, and executable by, the processor, to perform operations which comprise:
  - over a period of time, storing L actions taken by one or more customer support agents, wherein L is a positive integer representing a total number of stored actions;
  - in real time, for each positive integer value n between a first loop value and a second loop value:
    - with a window of length n, starting at a first position within the stored L actions and ending at an L-nth position within the stored L actions, repeatedly:
      - scanning the stored L actions;
      - creating an automation candidate comprising an ordered sequence of n actions, from the stored L actions, that fall within the window of length n;
      - storing the automation candidate; and
      - incrementing a position of the window of length n;
    - incrementing the value of n;
  - identifying repeated automation candidates of the stored automation candidates;
  - filtering the repeated automation candidates to select final automation candidates;
  - creating new automation routines from the final automation candidates;
  - storing the new automation routines in an automations database; and
  - reporting the new automation routines to a user.

2. The system of claim 1, wherein filtering the repeated automation candidates to select the final automation candidates comprises rejecting repeated automation candidates that occur less than a threshold number of times.

3. The system of claim 2, wherein the threshold number of times is user configurable.

4. The system of claim 1, wherein filtering the repeated automation candidates to select the final automation candidates comprises:
- identifying a repeated automation candidate of length N that includes a repeated automation candidate of length N-1, N being a positive integer;
- if the repeated automation candidate of length N has a same or greater number of occurrences as the repeated automation candidate of length N-1:
  - accepting the repeated automation candidate of length N; and
  - rejecting the repeated automation candidate of length N-1; or
- if the repeated automation candidate of length N has a smaller number of occurrences than the repeated automation candidate of length N-1:
  - accepting the repeated automation candidate of length N-1; or
  - rejecting the repeated automation candidate of length N.

5. The system of claim 1, wherein filtering the repeated automation candidates to select the final automation candidates comprises:
- identifying two of the repeated automation candidates of a same number of actions that share an action of the stored L actions;
- accepting a repeated automation candidate, of the two repeated automation candidates, that has a largest number of occurrences within the stored L actions; and
- rejecting the repeated automation candidate, of the two repeated automation candidates, that does not have the largest number of occurrences within the stored L actions.

6. The system of claim 5, wherein if the two repeated automation candidates have a same number of occurrences, selecting a first candidate of the two repeated automation candidates, selecting a second candidate of the two repeated automation candidates, or selecting a random candidate of the two repeated automation candidates.

7. The system of claim 1, wherein filtering the repeated automation candidates to select the final automation candidates comprises:
- identifying two of the repeated automation candidates of different number of actions that share an action of the stored L actions;
- accepting a repeated automation candidate, of the two repeated automation candidates, that has a greatest number of actions; and
- rejecting the repeated automation candidate, of the two repeated automation candidates, that does not have the greatest number of actions.

8. The system of claim 1, wherein the first loop value is 5 and the second loop value is 30.

9. The system of claim 1, wherein the operations further comprise converting the new automation routines into code.

10. The system of claim 9, wherein the operations further comprise making the code available on an automation finder application.

11. A computer-implemented method for automatically creating new automation routines, the method comprising:
- with a processor and a non-transitory computer readable medium operably coupled thereto:
  - over a period of time, storing L actions taken by one or more customer support agents, wherein L is a positive integer representing a total number of stored actions;

in real time, for each positive integer value n between a first loop value and a second loop value:

with a window of length n, starting at a first position within the stored L actions and ending at an L-nth position within the stored L actions, repeatedly:

scanning the stored L actions;

creating an automation candidate comprising an ordered sequence of n actions, from the stored L actions, that fall within the window of length n;

storing the automation candidate; and incrementing a position of the window of length n;

incrementing the value of n;

identifying repeated automation candidates of the stored automation candidates;

filtering the repeated automation candidates to select final automation candidates;

creating new automation routines from the final automation candidates;

storing the new automation routines in an automations database; and reporting the new automation routines to a user.

12. The method of claim 11, wherein filtering the repeated automation candidates to select the final automation candidates comprises rejecting repeated automation candidates that occur less than a threshold number of times.

13. The method of claim 12, wherein the threshold number of times is user configurable.

14. The method of claim 11, wherein filtering the repeated automation candidates to select the final automation candidates comprises:

identifying a repeated automation candidate of length N that includes a repeated automation candidate of length N-1, N being a positive integer;

if the repeated automation candidate of length N has a same or greater number of occurrences as the repeated automation candidate of length N-1:

accepting the repeated automation candidate of length N; and rejecting the repeated automation candidate of length N-1; or if the repeated automation candidate of length N has a smaller number of occurrences than the repeated automation candidate of length N-1:

accepting the repeated automation candidate of length N-1; or rejecting the repeated automation candidate of length N.

15. The method of claim 11, wherein filtering the repeated automation candidates to select the final automation candidates comprises:

identifying two of the repeated automation candidates of a same number of actions that share an action of the stored L actions;

accepting a repeated automation candidate, of the two repeated automation candidates, that has a largest number of occurrences within the stored L actions; and rejecting the repeated automation candidate, of the two repeated automation candidates, that does not have the largest number of occurrences within the stored L actions.

16. The method of claim 15, wherein if the two repeated automation candidates have a same number of occurrences, selecting a first candidate of the two repeated automation candidates, selecting a second candidate of the two repeated automation candidates, or selecting a random candidate of the two repeated automation candidates.

17. The method of claim 11, wherein filtering the repeated automation candidates to select the final automation candidates comprises:

identifying two of the repeated automation candidates of different number of actions that share an action of the stored L actions;

accepting a repeated automation candidate, of the two repeated automation candidates, that has a greatest number of actions; and rejecting the repeated automation candidate, of the two repeated automation candidates, that does not have the greatest number of actions.

18. The method of claim 11, wherein the first loop value is 5 and the second loop value is 30.

19. The method of claim 11, wherein the method further comprises converting the new automation routines into code.

20. The method of claim 19, wherein the method further comprises making the code available on an automation finder application.

* * * * *